United States Patent [19]

Komedashi et al.

[11] Patent Number: 5,754,731
[45] Date of Patent: May 19, 1998

[54] DISK REGENERATIVE APPARATUS

[75] Inventors: Hisashi Komedashi, Yokohama; Masaki Ohki, Fujisawa; Yasuhiro Yakushiji; Kouji Kamogawa, both of Yokohama, all of Japan

[73] Assignee: Hitachi, Ltd., Tokyo, Japan

[21] Appl. No.: 816,494

[22] Filed: Mar. 13, 1997

Related U.S. Application Data

[63] Continuation of Ser. No. 393,117, Feb. 21, 1995, abandoned.

[30] Foreign Application Priority Data

Feb. 28, 1994 [JP] Japan .................................. 6-030003

[51] Int. Cl.[6] .............................................. H04N 5/781
[52] U.S. Cl. .................................... 386/125; 386/46
[58] Field of Search ................ 386/46, 125, 105, 386/106, 83; 348/705, 730; 369/32; H04N 5/781

[56] References Cited

U.S. PATENT DOCUMENTS 4,717,968 1/1988 Painton et al. .................. 358/342
4,841,367 6/1989 Ichikawa et al. ................ 348/705

FOREIGN PATENT DOCUMENTS

| 570208674A | 6/1981 | Japan . |
| 580118064A | 12/1981 | Japan . |
| 010236478A | 1/1989 | Japan . |
| 2-89176 | 8/1996 | Japan . |
| 2106304 | 7/1982 | United Kingdom . |

*Primary Examiner*—Thai Tran
*Assistant Examiner*—Muy Nguyen
*Attorney, Agent, or Firm*—Fay, Sharpe, Beall, Fagan, Minnich & McKee

[57] ABSTRACT

The regenerative apparatus for feeding back a disk type recording medium has a control unit for putting the regenerative apparatus into the feedback halt state when a display command of a television broadcast program is outputted when the regenerative apparatus performs a feedback operation and selects signals from the regenerative apparatus, selecting video signals of the television broadcast program, canceling the feedback halt state of the regenerative apparatus and putting it into the feedback state when a display command of video signals from the regenerative apparatus is outputted thereafter, and selecting video signals from the regenerative apparatus.

7 Claims, 2 Drawing Sheets

DISK REGENERATIVE APPARATUS

This is a continuation of U.S. application Ser. No. 08/393,117 filed Feb. 21, 1995, abandoned.

BACKGROUND OF THE INVENTION

The present invention relates to a regenerative apparatus for feeding back recorded signals on a disk-shaped recording medium such as a video CD.

There is a prior art that when a regenerative apparatus such as a VTR tape using a magnetic tape as a recording medium or a video disk is connected to a television receiver, images of a received television broadcast program (hereinafter referred to as a TV broadcast program) or images of feedback video signals from the regenerative apparatus can be selectively displayed by an instruction from a user.

In a television receiver to which a VTR regenerative apparatus is connected, when video signals from the regenerative apparatus are fed back, there is a case that the contents of the TV broadcast program which is being received at present are watched. Generally a VTR has a tuner. When the VTR is kept on, received video signals by the tuner are supplied to the television receiver and VTR recording system. Furthermore, the VTR is structured so as to selectively supply video signals from the regenerative system of the VTR and received video signals by the tuner to the television receiver. Therefore, when the VTR is put into the stop mode, the screen is instantaneously switched to image display of the received TV broadcast program.. When the VTR is returned to the feedback mode, the screen is switched to image display of feedback video signals starting from the position when the VTR is put into the stop mode almost at the same time.

In a television receiver to which a video disk regenerative apparatus is connected, when the contents of the TV broadcast program which is being received at present are watched when video signals from the regenerative apparatus are fed back, by stopping the regenerative apparatus and switching the input of the television receiver, images of the TV broadcast program can be displayed. Also images of the TV broadcast program can be switched to images of feedback video signals of the regenerative apparatus by switching the input of the television receiver and feeding back the regenerative apparatus.

In the aforementioned television receiver to which a video disk regenerative apparatus is connected, when the contents of the TV broadcast program which is being received at present are watched when video signals from the regenerative apparatus are fed back with the regenerative apparatus kept in the feedback mode, images which are fed back until the video signals from the regenerative apparatus are returned to images cannot be watched. The same may be said with audio signals which are outputted in synchronization with video signals. Furthermore, the same may be said with a case that a disk of only audio signals is fed back using the aforementioned video disk regenerative apparatus.

As a means to solve the above problem, for example, there is a marker function indicated in Japanese Patent Application Laid-Open No. 2-89176, which puts the aforementioned regenerative apparatus into the stop mode. When the video disk regenerative apparatus enters the stop mode, the pickup moves to the specified feedback top position such as the innermost circumference or the outermost circumference and stands by. When the video disk regenerative apparatus is returned to the feedback mode, the marker function uses the time code as position information recorded on the disk. By saving the time code indicating the feedback position when the stop mode is instructed in the memory, the pickup can be moved so as to restart feedback continuously from the position when the stop mode is instructed. By doing this, the continuity of feedback images and voice can be ensured.

SUMMARY OF THE INVENTION

There are problems imposed in the prior art as shown below.

1) Since the aforementioned marker function uses the time code as the position information stored on the disk, the hour and minute which are required for the pickup to move from the specified feedback top position, images, and voice are interrupted.

2) The aforementioned marker function requires an input switching operation of the television receiver and a plurality of operations of feedback and stop of the video disk regenerative apparatus.

An object of the present invention is to eliminate the difficulties 1) and 2) mentioned above and to provide a disk regenerative apparatus which can display instantaneously starting from images at the point of time that feedback image display of the regenerative apparatus is switched to image display of the receiving TV broadcast program when image display of the receiving TV broadcast program is switched to feedback image display of the regenerative apparatus after feedback image display of the regenerative apparatus is switched to image display of the receiving TV broadcast program.

Another object of the present invention is to provide a disk regenerative apparatus which can further suppress unnecessary power consumption of the aforementioned disk regenerative apparatus.

To accomplish the above object, the present invention has a selective means for selecting and displaying video signals of the received TV broadcast program, video signals from an external apparatus, and feedback video signals of the aforementioned regenerative apparatus. Furthermore, the present invention controls the whole including the aforementioned regenerative apparatus and selective means on the basis of a command from the operating unit. When a display command of images of a television broadcast program is outputted from the operating unit when the regenerative apparatus performs a feedback operation and the selective means selects video signals from the regenerative apparatus, the present invention puts the regenerative apparatus into the feedback halt state and switches the selective means so as to select video signals of the received television broadcast program. When a display command of images of video signals from the regenerative apparatus is outputted from the operating unit thereafter, the present invention has a control means for canceling the feedback halt state of the regenerative apparatus and putting it into the feedback state and for switching the selective means so as to select video signals from the regenerative apparatus. Voice signals which are outputted in synchronization with video signals are switched in connection with video signals. Furthermore, the same may be said with a case that a disk of only voice signals is fed back using the video disk regenerative apparatus.

To accomplish the above another object, according to the present invention, when the regenerative apparatus is kept in the aforementioned feedback halt state for the predetermined time, the control means stops the regenerative apparatus and turns the power thereof off.

When an image display command of a TV broadcast program is outputted to the control means from the operating means when images of video signals of the regenerative apparatus are being displayed, the regenerative apparatus is set in the feedback halt state, and the selective means selects video signals of the receiving TV broadcast program, and the images are displayed. Image display of the regenerative apparatus is switched to the receiving TV broadcast program by switching of the selective means, so that image display on the display screen is switched to instantaneously. In this case, the regenerative apparatus is in the feedback halt state, and the disk type recording medium is in the stationary rotation state, and the pickup is held at the position immediately before this feedback halt state is set. In this state, the regenerative apparatus is feeding back the disk type recording medium and feedback signals at this time are interrupted by the selective means. When an image display command of the regenerative apparatus is outputted to the control means from the operating means thereafter, the regenerative apparatus is released from the feedback halt state. In this case, as mentioned above, the disk type recording medium is in the stationary rotation state and the pickup is held at the position immediately before this feedback halt state is set, so that the feedback starts from the position immediately. Switching control of the selective means is executed at the same time and video signals of the regenerative apparatus are selected. Therefore, image display of the receiving TV broadcast program is switched to image display of the regenerative apparatus immediately.

When image display of the receiving TV broadcast program is continued for a long time after image display of the regenerative apparatus is switched to image display of the receiving TV broadcast program, a user generally requires images of the receiving TV broadcast program but not feedback images of the regenerative apparatus. Keeping the regenerative apparatus in the feedback halt state for a long time results in unnecessary power consumption. Therefore, when the feedback halt state is continued for the predetermined time, the present invention stops the regenerative apparatus and turns the power off so as to eliminate unnecessary power consumption.

In the aforementioned embodiment, image display of the receiving TV broadcast program is switched to temporarily during image display of the regenerative apparatus and images of the regenerative apparatus are displayed again. However, not only the receiving TV broadcast program but also images and voice of an external apparatus such as a VTR which is connected to the external input terminal which is installed in the television set may be used.

As explained above, according to the present invention, display of feedback images of the regenerative apparatus is switched to display of images of a TV broadcast program under control of the selective means by the control apparatus, so that it can be done instantaneously by a very simple operation. When this display switching is executed, the regenerative apparatus is in the feedback halt state and in the state that a circuit of track immediately before it is set in the feedback halt state is fed back and display of images of a TV broadcast program is also switched to display of feedback images of the regenerative apparatus under control of the selective means by the control apparatus. Therefore, by performing a very simple operation, image display is executed instantaneously from the part which is interrupted by setting of the feedback halt state.

According to the present invention, when image display of a TV broadcast program is to be continued as it is after image display of the regenerative apparatus is switched to image display of the TV broadcast program the regenerative apparatus enters the stop state under control of the control apparatus after the predetermined time elapses and the power thereof is turned off. Therefore, without a special operation being performed, unnecessary power consumption by the regenerative apparatus can be eliminated.

DETAILED DESCRIPTION OF THE PREFERRED EMBODIMENT

The embodiment of the present invention will be explained hereunder with reference to the accompanying drawings.

Figure 1:
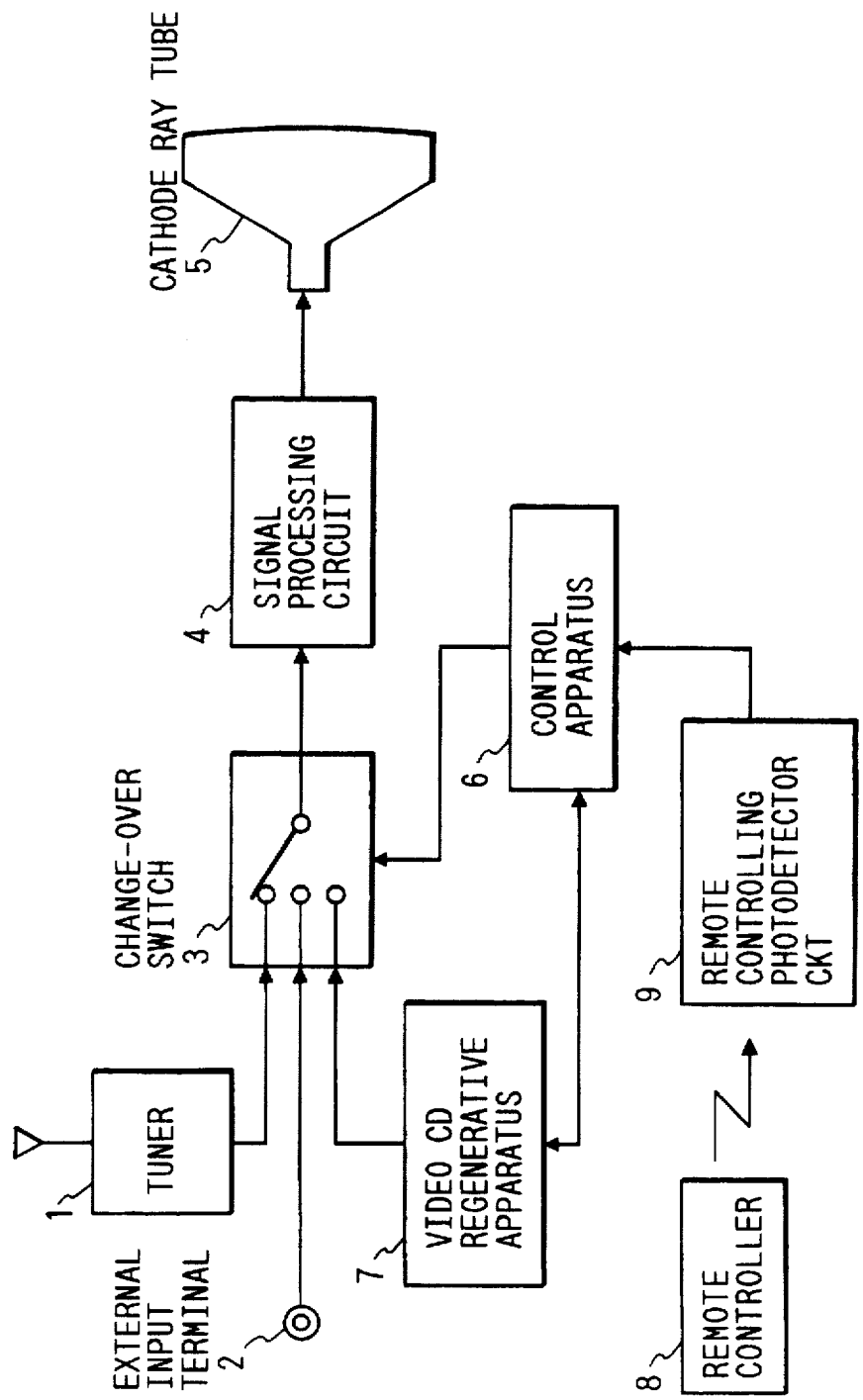
FIG. 1 is a block diagram of an embodiment of a television receiver containing the regenerative apparatus of the present invention.

FIG. 1 is a block diagram showing an embodiment that the disk regenerative apparatus of the present invention is contained in a television receiver. Numeral 1 indicates a tuner, 2 an external input terminal, 3 a change-over switch, 4 a signal processing circuit, 5 a cathode ray tube, 6 a control apparatus, 7 a video CD regenerative apparatus, 8 a remote controller, and 9 a remote controlling photodetector circuit.

In the drawing, the video CD regenerative apparatus 7 is installed in a frame of the television receiver which is not shown in the drawing. The control apparatus 6 consisting of a microcomputer or others controls the television receiver on the basis of a control command supplied from the remote controller 8 which is operated by a user via the remote controlling photodetector circuit 9 and also controls the operation of the video CD regenerative apparatus 7. The change-over switch 3 selects one of video signals of a TV broadcast program which is selected by the tuner 1, video signals from an external apparatus such as a VTR or video camera which is connected to the external input terminal 2, and feedback video signals of the video CD regenerative apparatus under control by the control apparatus 6. Video signals selected by this change-over switch 3 are processed by the signal processing circuit 4 and supplied to the cathode ray tube 5 so as to be displayed as images.

Next, the operation of this embodiment will be explained. When a receiving command of a TV broadcast program is outputted by the remote controller 8, the control apparatus 6 switches the change-over switch 3 to the Tuner 1 side, selects video signals from the tuner 1, and supplies them to the signal processing circuit 4. When a channel selection control command is received from the remote controller 8, the control apparatus 6 controls the tuner 1 so as to switch to reception of a TV broadcast program of the desired channel. When a video signal input command from the external apparatus is outputted by the remote controller 8, the control apparatus 6 switches the change-over switch 3 to the external terminal 2 side, selects video signals from the external apparatus, and supplies them to the signal processing circuit 4. When a feedback command of the video CD regenerative apparatus 7 is outputted by the remote controller 8, the control apparatus 6 puts the video CD regenerative apparatus 7 to the feedback state, switches the change-over switch 3 to the video CD regenerative apparatus 7 side, selects the feedback video signals thereof, and supplies them to the signal processing circuit 4.

In this embodiment, when a receiving command of a TV broadcast program is outputted from the remote controller 8 when the video CD regenerative apparatus 7 is in the feedback state and images of feedback video signals thereof are displayed on the cathode ray tube 5, the control apparatus 6 puts the video CD regenerative apparatus 7 into the feedback halt state and switches the change-over switch 3 to the Tuner 1 side so as to display images of the desired TV broadcast program on the cathode ray tube 5. When a feedback command of the video CD regenerative apparatus 7 is outputted from the remote controller 8 in this state, the control apparatus 6 cancels the feedback halt state of the video CD regenerative apparatus 7 and puts it into the feedback state and switches the change-over switch 3 to the video CD regenerative apparatus 7 side simultaneously with it. By doing this, images of feedback video signals of the video CD regenerative apparatus 7 are displayed on the cathode ray tube 5 again.

Figure 2:
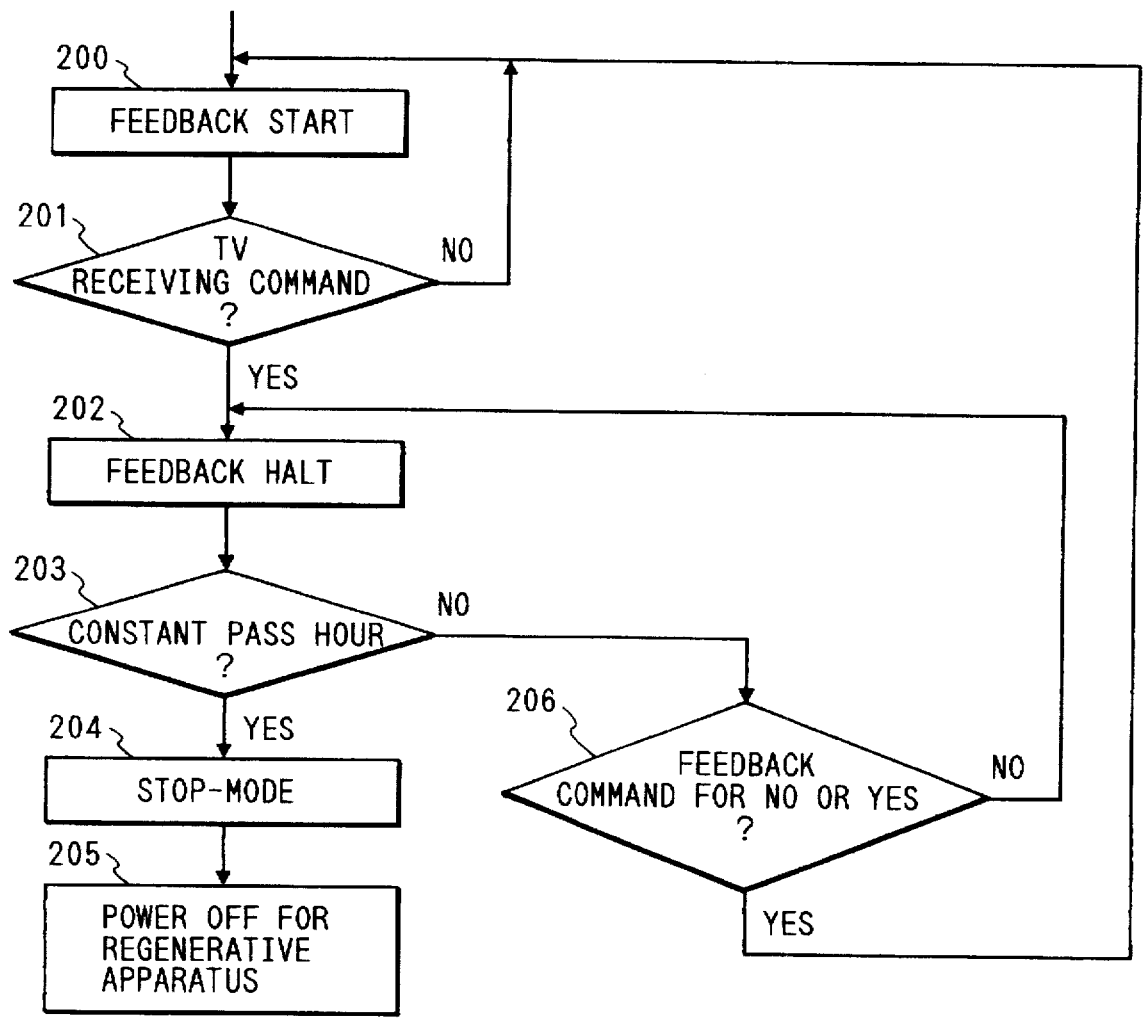
FIG. 2 is a flow chart showing an example of the embodiment shown in FIG. 1.

Such a control operation of the control apparatus 6 will be explained hereunder with reference to FIG. 2.

When a feedback start of the video CD regenerative apparatus 7 is outputted from the remote controller 8, the control apparatus 6 lets the video CD regenerative apparatus 7 to start feedback, switches the change-over switch 3 to the video CD regenerative apparatus 7 side, and lets the cathode ray tube 5 display images of feedback video signals thereof (Step 200). This feedback operation is continued unless another control command is outputted from the remote controller 8. When a receiving command of a TV broadcast program is outputted from the remote controller 8 thereafter (Step 201), the control apparatus 6 puts the video CD regenerative apparatus 7 into the halt state, switches the change-over switch 3 to the Tuner 1 side, and lets the cathode ray tube 5 display images of the receiving TV broadcast program (Step 202).

When the remote controller 8 only performs an operation for receiving a TV broadcast program as mentioned above, image display of feedback video signals of the video CD regenerative apparatus is switched to display of images of the TV broadcast program instantaneously.

When the video CD regenerative apparatus 7 is in the feedback halt state, the video CD is kept so as to rotate in the stationary number of revolutions and the pickup is fixed at the position immediately before the halt mode is set. In this case, the pickup feeds back and scans the track on the same circumference repeatedly and outputs a feedback signal from the track. The feedback signal is interrupted by the change-over switch 3.

While images of a receiving TV broadcast program is being displayed on the cathode ray tube 5 as mentioned above, the control apparatus 6 decides whether such image display exceeds the constant period of time t which is predetermined (for example, 5 to 15 minutes) or not (Step 203) and decides whether a feedback command of the video CD regenerative apparatus 7 is outputted from the remote controller 8 or not (Step 206). When a feedback command of the video CD regenerative apparatus is outputted from the remote controller 8 before this constant period of time t elapses, the control apparatus 6 cancels the feedback halt state of the video CD regenerative apparatus 7 and puts it into the feedback state, switches the change-over switch 3 to the video CD regenerative apparatus 7 side simultaneously with it, and lets the cathode ray tube 5 display images of feedback video signals thereof (Step 200).

When the video CD regenerative apparatus 7 is in the feedback halt state as mentioned above, the video CD rotates in the stationary number of revolutions and the pickup is fixed at the position immediately before the halt mode is set. Therefore, almost simultaneously with that the feedback is switched to, the pickup starts feedback from this position. Therefore, on the cathode ray tube 5, image display of a TV broadcast program is switched to image display of feedback video signals of the video CD regenerative apparatus instantaneously. Furthermore, this image display of feedback video signals starts from the position which is interrupted by setting of the feedback halt state and the part following the part which is already watched can be watched. Images to be displayed can be switched only by performing an operation for feedback of the video CD regenerative apparatus 7 by the remote controller 8.

On the other hand, when the video CD regenerative apparatus 7 enters the feedback halt state at Step 202 and a feedback command of the video CD regenerative apparatus 7 is not outputted even when the aforementioned constant period of time t elapses after the image display of the TV broadcast program starts (Step 203), the control apparatus 6 stops the video CD regenerative apparatus 7 on the assumption that feedback of the video CD regenerative apparatus 7 becomes unnecessary (Step 204) and turns the power of the video CD regenerative apparatus 7 off (Step 205).

By turning the power of the video CD regenerative apparatus 7 whose feedback becomes unnecessary when the image display of a TV broadcast program is continued as mentioned above, unnecessary power consumption can be eliminated.

In the aforementioned embodiment, the video CD is used. However, another disk type recording medium, for example, a photo-magnetic disk or magnetic disk may be used. However, when a magnetic disk is used, the track on the same circumference is scanned repeatedly in the state that the magnetic head is in contact with the magnetic disk in the feedback halt state and the magnetic disk may be damaged easily, so that the aforementioned constant period of time t during which the feedback halt mode is continued is shortened.

In the aforementioned embodiment, the remote controller is used for control. However, the operating unit installed in the television receiver may be used for control. Furthermore, in the aforementioned embodiment, by pressing the input switching button, it may be instructed to switch display of images of a TV broadcast program to display of images of feedback video signals of the video CD regenerative apparatus 7 or by putting the video CD regenerative apparatus 7 into the feedback mode and switching the change-over switch 3 to the video CD regenerative apparatus 7 side, it may be instructed to switch display of images of a TV broadcast program to display of images of feedback video signals of the video CD regenerative apparatus 7.

In addition, in the aforementioned embodiment, video signals are explained. However, not only display of video signals but also the same may be said with feedback of audio signals or others.

The present invention may be executed in another form of the aforementioned embodiment unless it deviates from the motive or main characteristics thereof. Therefore, the aforementioned embodiment is only a simple example of the present invention in every respect and is not to be interpreted limitedly. The scope of the present invention is indicated by the scope of claims. Furthermore, modifications and changes belonging to the average scope of the scope of claims are all included in the scope of the present invention.

What is claimed is:

1. A disk reproduction control system comprising:
   a disk regenerative apparatus to be connected to a television receiver, said disk regenerative apparatus having a feedback state in which said disk regenerative apparatus supplies a reproduced feedback signal to a signal processing unit of the television receiver, a feedback halt state in which a disk type recording medium of said disk regenerative apparatus is kept so as to rotate at a stationary number of revolutions and a pick-up is fixed at a position immediately before the feedback halt state is set, and a stop state in which power of said regenerative apparatus is turned off;

a selection unit for selecting one of signals other than the feedback signal from said regenerative apparatus, and the feedback signal from said disk regenerative apparatus, said selection unit supplying the selected one signal to a signal processing unit of the television receiver; and a control unit for supplying a control signal to said selection unit, said control unit putting said disk regenerative apparatus into the feedback halt state when one of the signals other than the feedback signal from said disk regenerative apparatus is selected in the feedback state of said disk regenerative apparatus and supplying a signal selected from the signal other than the feedback signal from said disk regenerative apparatus to the signal processing unit so as to display desired images on a display, and said control unit inputting the feedback signal to said signal processing unit thereafter again when the feedback signal of said regenerative apparatus is selected, and letting said pickup start moving in the predetermined direction from the feedback halt state position.

2. A disk reproduction control system comprising:

a disk regenerative apparatus to be connected to a television receiver, said disk regenerative apparatus having a feedback state in which said disk regenerative apparatus supplies a reproduced feedback signal to a signal processing unit of the television receiver, a feedback halt state in which a disk type recording medium of said disk regenerative apparatus is kept so as to rotate a stationary number of revolutions and a pick-up is fixed at a position immediately before the feedback halt state is set, and a stop state in which power of said regenerative apparatus is turned off;

a selection unit for selecting one of signals from a television tuner, and the feedback signal from said disk regenerative apparatus, said selection unit supplying the selected signal to a signal processing unit of the television receiver; and a control unit for supplying a control signal to said selection unit, said control unit putting said disk regenerative apparatus into the feedback halt state when the television tuner signal is selected in the feedback state of said disk regenerative apparatus and supplying the television tuner signal to the signal processing unit so as to display desired images on a display, and said control unit inputting the feedback signal of said disk regenerative apparatus to said signal processing unit thereafter when the feedback signal of said regenerative apparatus is selected, and letting said pickup start moving in the predetermined direction from the feedback halt state position.

3. A disk reproduction control system comprising:

a disk regenerative apparatus to be connected to a television receiver, said disk regenerative apparatus having a feedback state in which said disk regenerative apparatus supplies a reproduced feedback signal to a signal processing unit of the television receiver, a feedback halt state in which a disk type recording medium of said disk regenerative apparatus is kept so as to rotate a stationary number of revolutions and a pick-up is fixed at a position immediately before the feedback halt state is set, and a stop state in which power of said regenerative apparatus is turned off;

a selection unit for selecting one of signals from a TV tuner, an external apparatus such as a VTR or video camera which is connected to an external input terminal, and the feedback signal from said disk regenerative apparatus, said selection unit supplying the selected signal to a signal processing unit; and a control unit for supplying a control signal to said selection unit, said control unit putting said disk regenerative apparatus into the feedback halt state when one of the television tuner signal and the external apparatus signal is selected in the feedback state of said disk regenerative apparatus and for supplying a signal selected from the television tuner signal and the external apparatus signal to the signal processing unit so as to display desired images on a display, and said control unit inputting the feedback signal of said disk regenerative apparatus to said signal processing unit thereafter when the feedback signal of said regenerative apparatus is selected, and letting said pickup start moving in the predetermined direction from the feedback halt state position.

4. The disk reproduction control system according to claim 1, wherein said control unit continues the stop state of said regenerative apparatus for the predetermined time and then turns the power of said regenerative apparatus OFF.

5. The disk reproduction control system according to claim 2, wherein said control unit continues the stop state of said regenerative apparatus for the predetermined time and then turns the power of said regenerative apparatus OFF.

6. The disk reproduction control system according to claim 3, wherein said control unit continues the stop state of said regenerative apparatus for the predetermined time and then turns the power of said regenerative apparatus OFF.

7. A television receiving system comprising:

a signal processing unit;

a television tuner;

a disk regenerative apparatus having a feedback state in which said disk regenerative apparatus supplies a reproduced feedback signal to said signal processing unit, a feedback halt state in which a disk type recording medium of said disk regenerative apparatus is kept so as to rotate at a stationary number of revolutions and a pick-up is fixed at the position immediately before the feedback halt state is set, and a stop state in which power of said regenerative apparatus is turned off;

a selection unit for selecting one of signals from said television tuner, an external apparatus such as a VTR or video camera which is connected to an external input terminal, and the feedback signal from said disk regenerative apparatus, said selection unit supplying the selected signal to said signal processing unit; and a control unit for supplying a control signal to said selection unit, said control unit putting said disk regenerative apparatus into the feedback halt state when one of the television tuner signal and the external apparatus signal is selected in the feedback state of said disk regenerative apparatus and for supplying a signal selected from said television tuner signal and the external apparatus signal to the signal processing unit so as to display desired images on a display, and said control unit inputting the feedback signal of said disk regenerative apparatus to said signal processing unit thereafter when a feedback signal of said regenerative apparatus is selected again, and letting said pickup start moving in the predetermined direction from the feedback halt state position.

* * * * *